(12) United States Patent
Edwards et al.

(10) Patent No.: US 11,823,197 B2
(45) Date of Patent: Nov. 21, 2023

(54) AUTHENTICATING BASED ON USER BEHAVIORAL TRANSACTION PATTERNS

(71) Applicant: Capital One Services, LLC, McLean, VA (US)

(72) Inventors: Joshua Edwards, Philadelphia, PA (US); Vyjayanthi Vadrevu, Pflugerville, TX (US); Tyler Maiman, Melville, NY (US); Daniel Miller, Astoria, NY (US); David Septimus, New York, NY (US); Samuel Rapowitz, Roswell, GA (US); Viraj Chaudhary, Katy, TX (US); Jenny Melendez, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/443,732

(22) Filed: Jul. 27, 2021

(65) Prior Publication Data

US 2023/0035570 A1 Feb. 2, 2023

(51) Int. Cl.
| | |
|---|---|
| *G06Q 20/32* | (2012.01) |
| *G06Q 20/38* | (2012.01) |
| *H04L 29/06* | (2006.01) |
| *G06Q 20/10* | (2012.01) |
| *G06F 16/23* | (2019.01) |
| *G06Q 40/06* | (2012.01) |
| *G06Q 20/40* | (2012.01) |

(Continued)

(52) U.S. Cl.
CPC ......... *G06Q 20/4015* (2020.05); *G06Q 20/40* (2013.01)

(58) Field of Classification Search
CPC .......................... G06Q 20/4015; G06Q 20/40
See application file for complete search history.

(56) References Cited

U.S. PATENT DOCUMENTS 8,745,698 B1 * 6/2014 Ashfield ................. H04L 63/08
726/4
9,177,127 B1 11/2015 Dotan et al.
(Continued)

FOREIGN PATENT DOCUMENTS

WO WO-2015152905 A1 * 10/2015 ......... G06Q 20/4014

OTHER PUBLICATIONS

K. Skracic et al., "Question based user authentication in commercial environments," MIPRO 2014, May 26-30, 2014, Opatija, Croatia (Year: 2014).*

(Continued)

*Primary Examiner* — Daniel S Felten
*Assistant Examiner* — Douglas W Pinsky
(74) *Attorney, Agent, or Firm* — Banner & Witcoff, Ltd.

(57) ABSTRACT

Aspects described herein may allow for authenticating a user by generating a customized set of authentication questions based on spending patterns that are automatically detected and extracted from user data. The user data may include transaction data collected over a period of time that may indicate the types of merchants that a user frequently transacts with. By automatically detecting user patterns that correspond to user behavior over a period of time, an authentication system may be able to generate authentication questions about those spending patterns that are easily answerable to an authentic user but difficult to guess or circumvent for any other user.

20 Claims, 4 Drawing Sheets

(51) Int. Cl.
  G06Q 20/36   (2012.01)
  H04W 12/06   (2021.01)
  H04W 12/08   (2021.01)
  G06Q 20/24   (2012.01)
  G06Q 20/14   (2012.01)
  G06Q 40/03   (2023.01)
  H04W 4/14    (2009.01)
  G06F 21/45   (2013.01)
  G06F 21/31   (2013.01)
  G06Q 40/02   (2023.01)
  H04W 12/062  (2021.01)
  H04W 12/72   (2021.01)
  G06F 21/32   (2013.01)
  H04W 60/00   (2009.01)
  G06Q 20/34   (2012.01)
  G06F 3/0482  (2013.01)

(56) References Cited

U.S. PATENT DOCUMENTS

| | | | | |
|---|---|---|---|---|
| 10,572,653 B1* | 2/2020 | Semichev | | G06N 5/01 |
| 10,755,281 B1* | 8/2020 | Yip | | G06Q 20/4016 |
| 10,977,725 B1* | 4/2021 | Flowers | | G06Q 30/0207 |
| 2009/0024485 A1* | 1/2009 | Haugen | | G06Q 30/0225 705/14.25 |
| 2009/0106134 A1* | 4/2009 | Royyuru | | G06Q 40/00 705/35 |
| 2014/0189829 A1* | 7/2014 | McLachlan | | G06Q 20/4014 726/6 |
| 2015/0161366 A1* | 6/2015 | Ghosh | | G06F 21/31 726/5 |
| 2016/0299661 A1* | 10/2016 | Alpert | | G06T 17/05 |
| 2019/0121918 A1* | 4/2019 | Fort | | G06N 20/00 |
| 2019/0377819 A1* | 12/2019 | Filliben | | G06N 3/084 |
| 2020/0201907 A1* | 6/2020 | Wu | | G06Q 40/02 |
| 2021/0073371 A1 | 3/2021 | Semichev et al. | | |
| 2021/0173916 A1 | 6/2021 | Ortiz et al. | | |
| 2022/0197306 A1* | 6/2022 | Cella | | B33Y 10/00 |

OTHER PUBLICATIONS

Nov. 15, 2022—(WO) International Search Report and Written Opinion—App No. PCT/US2022/038465.

* cited by examiner

| Tx Time | Merchant | Merchant Type | Amount | Rewards Category |
|---|---|---|---|---|
| 3-11-21, 9:30AM | Café Viraj | Coffee | $3.15 | 0 |
| 3-10-21, 9:25AM | Café Viraj | Coffee | $3.15 | 0 |
| 3-9-21, 4:12PM | DaveMart | Gas | $43.22 | 1 |
| 3-8-21, 2:01PM | Sam's Stop | Gas | $28.58 | 1 |
| 3-5-21, 7:35AM | Jenny's Coffee | Coffee | $11.22 | 0 |
| 3-4-21, 11:54AM | DaveMart | Gas | $54.33 | 1 |
| 2-28-21, 9:34AM | Maiman Club | Gym | $1.25 | 0 |
| 2-27-21, 12:02PM | Maiman Club | Gym | $1.25 | 0 |
| 2-26-21, 7:45PM | Chez Edwards | Restaurant | $120.23 | 0 |
| 2-26-21, 1:13PM | Sam's Stop | Gas | $25.00 | 1 |
| 2-26-21, 8:45AM | Jenny's Coffee | Coffee | $2.15 | 0 |

AUTHENTICATING BASED ON USER BEHAVIORAL TRANSACTION PATTERNS

FIELD OF USE

Aspects of the disclosure relate generally to authentication of users and more specifically to systems that generate questions for authenticating user access to a user account.

BACKGROUND

Providing secure access to private user accounts and data is a constant problem. Malicious attackers frequently attempt to gain access to user accounts. Account providers need to be able to distinguish authentic users from malicious attackers. Account providers often attempt to authenticate a user by asking the user something that the account owner or other authentic user would know and that a malicious attacker would not. A common solution is a username and password, but this solution is not always sufficient, and cannot be used in every situation. Many solutions can make authentication too difficult for an authentic user or too easy to circumvent by a malicious attacker. There is a need for additional methods of distinguishing between authentic users, who should be granted access without excessive difficulty, and any other user, who should be denied access.

Aspects described herein may address these and other problems, and generally improve the quality, efficiency, and speed of user authentication methods.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for authenticating a user by generating a customized set of authentication questions based on spending patterns that are automatically detected and extracted from user data. The user data may include transaction data collected over a period of time that may indicate the types of merchants that a user frequently transacts with. By automatically detecting user patterns that correspond to user behavior over a period of time, an authentication system may be able to generate authentication questions about those spending patterns that are easily answerable to an authentic user but difficult to guess or circumvent for any other user.

More particularly, some aspects described herein may provide a computer-implemented method for receiving, from a user device, a request for access to an account associated with a user. The method may comprise retrieving transaction data for the account, wherein the transaction data indicates a plurality of transactions, and generating, based on the transaction data, for each transaction of the plurality of transactions, machine learning inputs. Then, the method may comprise providing the machine learning inputs to a machine learning algorithm to yield one or more machine learning outputs, and generating, based on the one or more machine learning outputs, a spending pattern associated with the user. The method may next comprise generating a list of merchants to authenticate the user by generating, based on the spending pattern, a first subset of merchants that each match at least one transaction indicated by the transaction data, generating, based on the spending pattern, a second subset of merchants that do not match any transactions indicated by the transaction data, and combining the first subset of merchants and the second subset of merchants to yield the list of merchants. The method may comprise providing the list of merchants to the user device, receiving, from the user device, for each merchant on the list of merchants, a response indicating whether the user transacted with the corresponding merchant; and providing, to the user device and based on the responses to the list of merchants, access to the account.

In some embodiments, the spending pattern may indicate one or more types of merchant that the user frequently transacts with via the account. Additionally and/or alternatively, the generating of the first subset of merchants based on the spending pattern may comprises determining a plurality of merchants that each match at least one transaction indicated by the transaction data, and removing, from the plurality of merchants, one or more merchants that do not match a type of merchant indicated by the spending pattern to yield the first subset of merchants.

In some embodiments, the generating of the second subset of merchants comprises determining a plurality of merchants that each match a type of merchant indicated by the spending pattern, and removing, from the plurality of merchants, any merchants that match any transactions indicated by the transaction data.

In some embodiments, the spending pattern indicates a period of time over which the user frequently transacts with a particular type of merchant via the account.

In some embodiments, the machine learning algorithm may be a clustering algorithm, the one or more machine learning outputs may be clusters of transactions, and the spending pattern may indicate at least one type of merchant corresponding to at least one of the one or more clusters of transactions.

The method may further comprise generating an authentication score based on the responses to the list of merchants, wherein the providing of access to the account comprises determining that the authentication score is higher than a threshold score. The generating of the authentication score may comprise one or more of increasing the authentication score when the user correctly indicates that the user did transact with a merchant of the first subset of merchants, decreasing the authentication score when the user incorrectly indicates that the user did not transact with a merchant of the first subset of merchants, increasing the authentication score when the user correctly indicates that the user did not transact with a merchant of the second subset of merchants, or decreasing the authentication score when the user incorrectly indicates that the user did transact with a merchant of the first subset of merchants.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for authenticating user access to user accounts. Account providers (e.g., financial institutions) commonly authenticate users using several methods, which may be easy to use but may suffer technological drawbacks. For example, account providers may ask users to provide answers to a few security questions (e.g., what city did you grow up in?). However, these types of questions may be easily guessable for malicious users that have basic information about an authentic user, and/or may be vulnerable to keylogging and other strategies because the same questions tend to be reused over and over. Another approach is displaying data about a recent transaction and asking the user whether they recognize it. However, this approach may be difficult for authentic users, who may not remember a particular transaction of the many transactions they make in a day, week, or month. Additionally, this approach may be vulnerable to circumvention by anyone who obtains basic information about one or more recent user purchases, for example by obtaining a recent user bill (e.g., in the mail or the trash) or tracking the behavior of the authentic user for a short amount of time (e.g., via in-person, online, or some other tracking method), etc.

Another particular problem addressed by techniques described herein is that users frequently have multiple credit cards and other accounts that they may use for specific types of transactions. For example, a user may use an account associated with a credit card primarily for gas station and grocery station transactions (e.g., because the account provides a particular level of rewards for those types of transactions). Thus, the user may mentally associate a particular account with a particular type of spending. Conversely, some accounts may be used for general transactions except for certain types of transactions (e.g., another account may be used for all transactions except gas station and grocery store transactions). This situation is further complicated by the use of rotating rewards categories that many credit cards and other accounts provide (e.g., 4% back on grocery store purchases for this month; 4% back on gas station purchases for last month, etc.), which may cause user spending patterns to change over time if the user intentionally adapts spending patterns (e.g., to maximize rewards) for such an account. Authentication questions that are not generated based on these typical spending patterns (e.g., because the user deviated from a usual pattern for a few transactions, erroneously used the wrong card, etc.) may tend to confuse the user and/or may be more likely to be answered incorrectly.

Among other features, the methods and systems described below improve on these problems by providing an authentication method that does not rely on recycled authentication questions, and is not easily vulnerable to circumvention by malicious users, but instead tailors authentication questions to user spending patterns, even when those spending patterns changes over time. By analyzing a potentially large volume of user transactions to automatically detect user spending patterns and other user patterns, and generate questions about the patterns that only an authentic user would likely know, an authentication server may provide a secure and robust authentication method.

An authentication server implementing the method as described below thus will be able to provide a secure authentication method that has several technological benefits. As one example, the generation of authentication information based on large data sets reduces the likelihood of circumvention by malicious users who are able to capture some data about an authentic user. Without obtaining a large amount of data about an authentic user, a malicious user is unlikely to be able to predict user spending patterns that are observed from a large data set, especially when those patterns change over time.

As another example of the technological benefits of the disclosure herein, the use of automated machine learning techniques to automatically identify clusters or other patterns from transaction data enables the generation of authentication information that may be impractical or even impossible for a human to generate. Users commonly conduct several transactions a day, and user transactions histories may include months or years of data, during which time spending patterns may change. Each transaction may be associated with a large number of data fields characterizing a particular transaction, a type of the transaction, a merchant involved in the transaction, information about the merchant involved in the transaction, an amount spent in the transaction, an item purchased in the transaction, etc. It may be impractical or impossible for a human to analyze such detailed data in large quantities and recognize patterns that may be used for authentication purposes. Thus, even if a malicious user did have a large volume of information about an authentic user, the malicious user may be unable to use the data to correctly respond to authentication questions generated by the authentication server.

As yet another example of the technological benefits of the disclosure herein, by automatically analyzing the transaction data using machine learning methods, detecting patterns from the machine learning outputs, and generating questions from the spending patterns, and by automatically providing the questions to a user, the authentication server may provide a robust authentication process that does not require a customer service operator or some other human at all. Indeed, many of the processes depicted herein could not be performed by a human being or via pen-and-paper at least because they involve too much data, complex computer-implemented processing using machine learning, and the like. Thus, social engineering and other types of confidence techniques may be unavailable to a malicious user seeking to gain access to an account.

Figure 1:
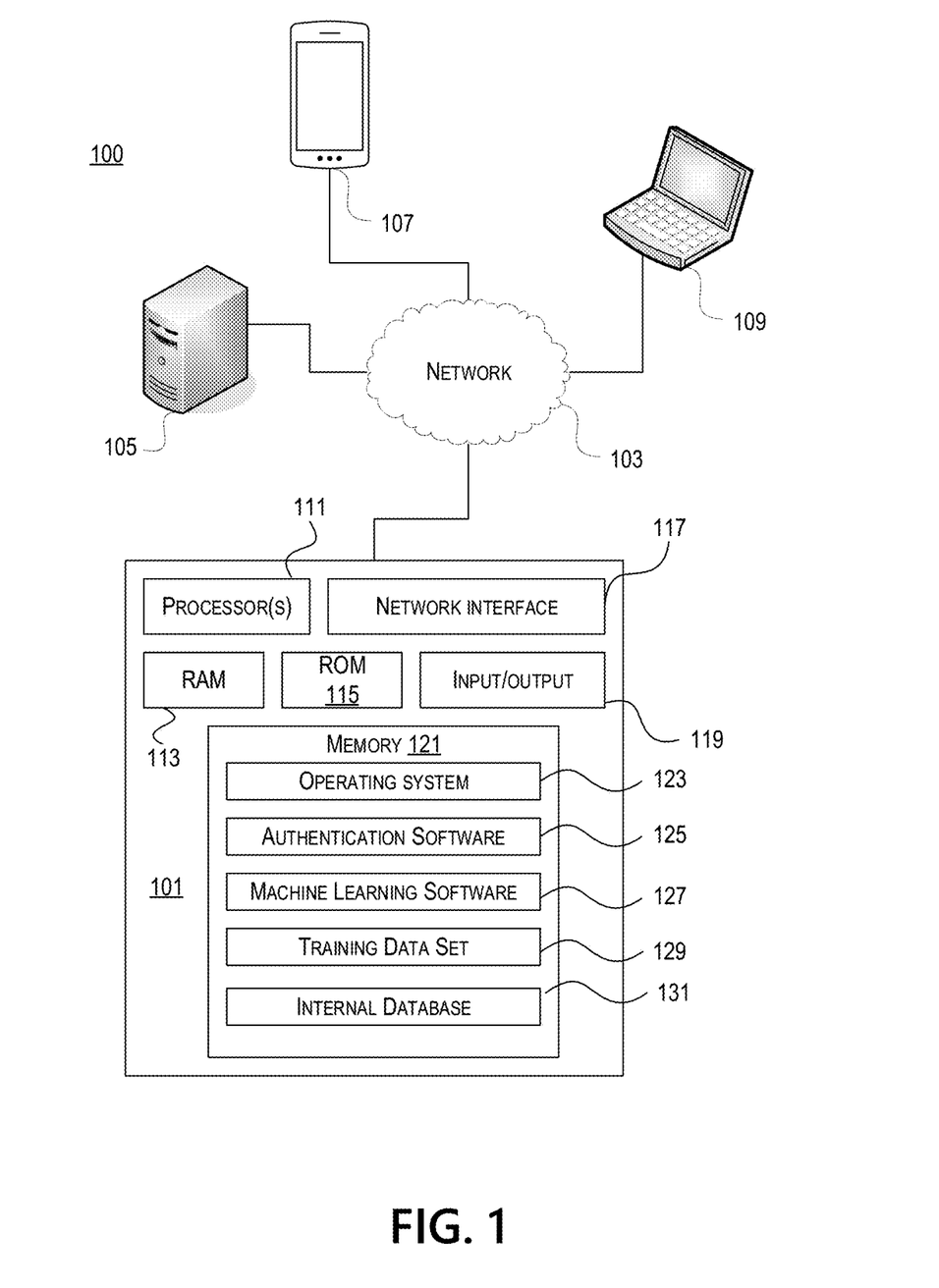
FIG. 1 shows an example of a authentication system in which one or more aspects described herein may be implemented.

FIG. 1 shows a system 100. The system 100 may include a plurality of devices including an authentication system 101, a plurality of user devices (e.g., mobile device 107, computing device 109), and/or account data server 105 in communication via a network 103. It will be appreciated that the network connections shown are illustrative and any means of establishing a communications link between the devices may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

User devices (e.g., mobile device 107, computing device 109) may send authentication requests to the authentication system 101 in order to obtain access to a user account as described herein. The account data server 105 may include databases of account information that may be accessed by the authentication system 101 as described herein. Databases may include, but are not limited to relational databases, hierarchical databases, distributed databases, in-memory databases, flat file databases, XML databases, NoSQL databases, graph databases, and/or a combination thereof. The authentication system 101 may receive authentication requests, obtain account information for accounts, generate customized authentication questions in order to verify users' identities, and authorize access to the accounts as described herein. The network 103 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

The authentication system 101 may be used to implement one or more of the techniques described herein. The authentication system 101 may include one or more processor(s) 111 for controlling overall operation of the authentication system 101 and its associated components, including RAM 113, ROM 115, input/output device 119, network interface 117, and/or memory 121. A data bus may interconnect processor(s) 111, RAM 113, ROM 115, memory 121, I/O device 119, and/or network interface 117. In some embodiments, the authentication system 101 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Software may be stored within memory 121 to provide instructions to processor(s) 111 to allow the authentication system 101 to perform various actions. For example, memory 121 may store software used by the authentication system 101, such as an operating system 123, software such as authentication software 125 and/or a machine learning software 127, and an associated internal database 131. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 114, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor(s) 111.

Network interface 117 may include one or more transceivers, digital signal processors, and/or additional circuitry and software for communicating via any network, wired or wireless, using any protocol as described herein.

The processor(s) 111 may include a single central processing unit (CPU), which may be a single-core or multi-core processor, or may include multiple CPUs. The processor(s) 111 and associated components may allow the authentication system 101 to execute a series of computer-readable instructions to perform some or all of the processes described herein. Although not shown in FIG. 1, various elements within memory 121 or other components in authentication system 101 may include one or more caches, for example, CPU caches used by the processor(s) 111, page caches used by the operating system 123, disk caches of a hard drive, and/or database caches used to cache content from database 131. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from a database 131 is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of the authentication system 101 are described separately, functionality of the various components may be combined and/or performed by a single component and/or multiple computing devices in communication without departing from the invention.

The user devices (e.g., mobile device 107, computing device 109), the account data server 105, and/or other devices (not shown) may have similar or different architecture as described with respect to authentication system 101. Those of skill in the art will appreciate that the functionality of authentication system 101 (or the mobile device 107, computing device 109, and/or account data server 105) as described herein may be spread across multiple data processing devices, for example, to distribute processing load across multiple computers, to segregate transactions based on geographic location, user access level, quality of service (QoS), etc. For example, the authentication system 101, the account data server 105, the mobile device 107, the computing device 109, and/or other devices (not shown) may operate in concert to provide parallel computing features in support of the operation of authentication software 125 and/or machine learning software 127.

Figure 2:
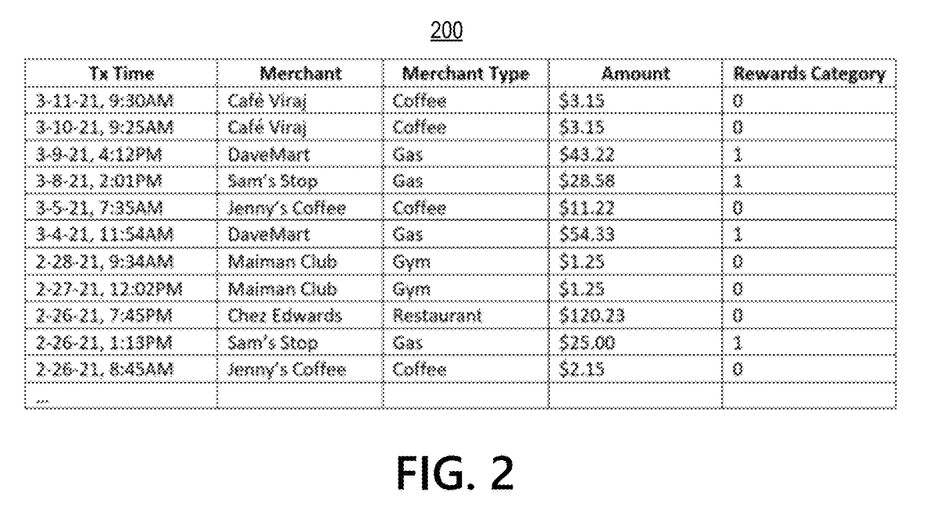
FIG. 2 shows example transaction data which may be analyzed to detect user spending patterns and other patterns as described herein.

FIG. 2 illustrates an example of transaction data 200 that may be stored by the account data server 105 and/or the authentication system 101, and that may be used as training data and/or input data for machine learning processes as described below.

The example transaction data 200 includes several example transactions that illustrate principles described below, although a real word data set may be far larger. The transactions may be associated with a particular user account (e.g., a credit card, debit card, or the like) and/or a plurality of accounts (e.g., one particular transaction may have been made via a credit card and another transaction may have been made via a debit card or a different credit card). The authentication system 101 and/or the account data server 105 may maintain a large number of transactions over a long period of time. Thus, although the example transactions include a few transactions over a short period, in practice the authentication system 101 and/or the account data server 105 may store user transaction data for months or years, which may yield a large volume of transactions that may be used to detect persistent spending patterns that take place over long periods and/or patterns that change over time.

The authentication server 101 may analyze the transactions to detect frequent spending patterns, as described in detail below, and ask the user questions that are generated based on the spending patterns in order to authenticate the user. For example, the authentication server 101 may be able to detect that the user frequently shops at a particular merchant (e.g., the user frequently shops at one or more particular coffee shops), the user frequently shops at a particular type of merchant (e.g., coffee shops, gas stations, gyms, etc.), that the user tends to use a particular card to shop at a rotating merchant types (e.g., to maximize credit card points based on rotating credit card rewards), and the like.

However, transactions that are not repeated may not be used for spending patterns. For example, the example transaction data 200 shows that a user has one transaction with a restaurant. Because the user uncommonly uses their account for restaurants, it may be advantageous for the authentication server 101 to not ask the user any questions about the restaurant transaction. The techniques described below may avoid generating spending patterns for infrequent (e.g., outlier) data and therefore ask questions that a user is more likely to remember the answers to.

Asking the user questions that are generated based on these spending patterns provides an authentication mechanism that may be easy to use for legitimate users (who are familiar with their own spending patterns) and difficult for malicious users (who may not know the habits and patterns of the user at issue) to compromise. Additionally, if a malicious user obtains a user's card and starts using it for malicious purchases, the authentication server 101 is unlikely to ask authentication questions about the recent malicious purchases unless they (by chance) happen to correspond to authentic user spending patterns. Thus, a malicious user's ability to bypass authentication based on the malicious user's own unauthorized transactions is reduced.

Based on the example transaction data 200, the authentication server 101 may analyze the example transaction data 200 using machine learning techniques as described in detail below and thereby determine that the user regularly transacts with particular coffee shops or gas stations. The authentication server 101 may generate a data structure representing these particular spending pattern(s). For example, the authentication server 101 may use machine learning techniques to process the transaction data 200 and generate one or more data structures indicating that the user frequently shops at one or more particular merchants and/or merchant types (e.g., a particular data structure may indicate may indicate one or more merchant type(s) (e.g., <coffee shops, gas stations>) that a user commonly transacts with. In another example, the authentication server 101 may process the example transaction data 200 using machine learning techniques to determine that the user typically uses the card to shop at one or more particular merchant(s) of a particular merchant type, (e.g., a data structure may indicate the merchant type and/or merchant, such as <gym, Maiman Club>). As a third example, the authentication server 101 may analyze the transaction data 200 to determine that the user has been using the account to shop at particular merchant(s) and/or merchant type(s) for a particular time period (e.g., the data structure may indicate <Feb. 26, 2021—present, gas stations, DaveMart, Sam's Stop>). The transaction data may further indicate whether the transaction corresponds to a particular rewards category offered by an account (e.g., 3% back on gas station purchases). Any of the example spending pattern data structures may thus further include a data field indicating whether the spending pattern matched a rewards category or not.

Figure 3:
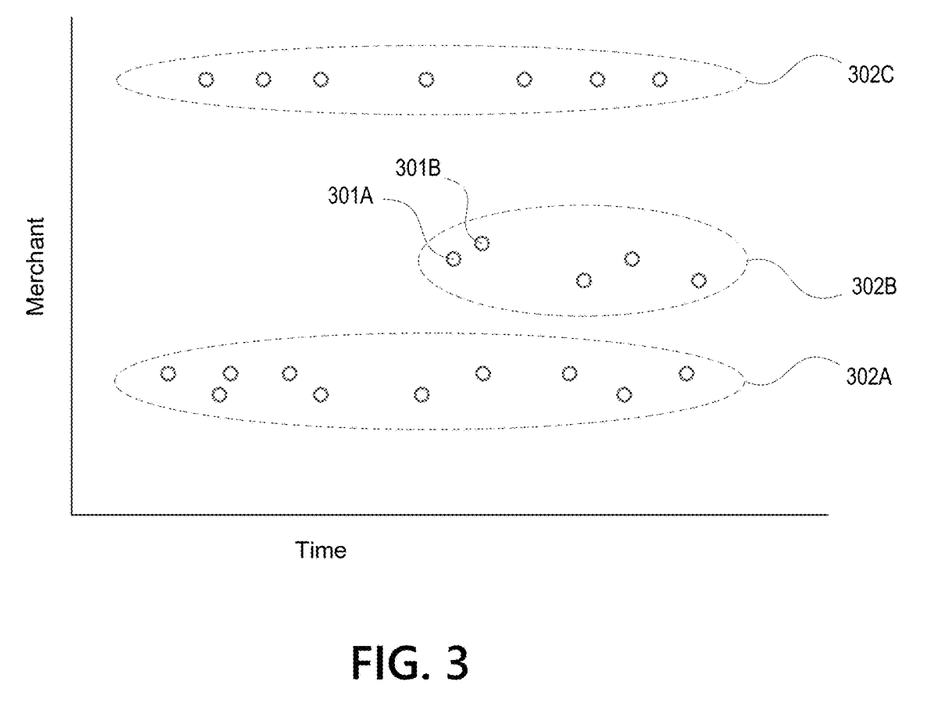
FIG. 3 shows and example of clustering user transaction data as described herein.

FIG. 3 illustrates an example of clustering transaction data to identify patterns. FIG. 3 presents a simplified example that only uses two dimensions and a few data points 301 (illustrated as circles) in clusters 302 (illustrated as ellipses in dashed lines). On the vertical (y) axis, the data points are arranged according to merchant, with merchants of the same type being adjacent to each other. On the horizontal (x) axis, the data points are arranged according to day. Thus, a first cluster 302A may include data points indicating transactions at a particular merchant type such as coffee shops. In the example cluster 302A, the user frequently shops at two different coffee shops, and this spending pattern is continuous over time. By comparison, a second cluster 302B may illustrate transactions that take place at another particular merchant or type of merchant over a more limited time period (e.g., gas station purchases for the previous two weeks). Thus, the second cluster 302B indicates a more recent spending pattern. Finally, example cluster 302C indicates transactions at a single merchant over a longer time period. Thus, a spending pattern may involve only a single merchant, rather than a type of merchant.

Figure 4:
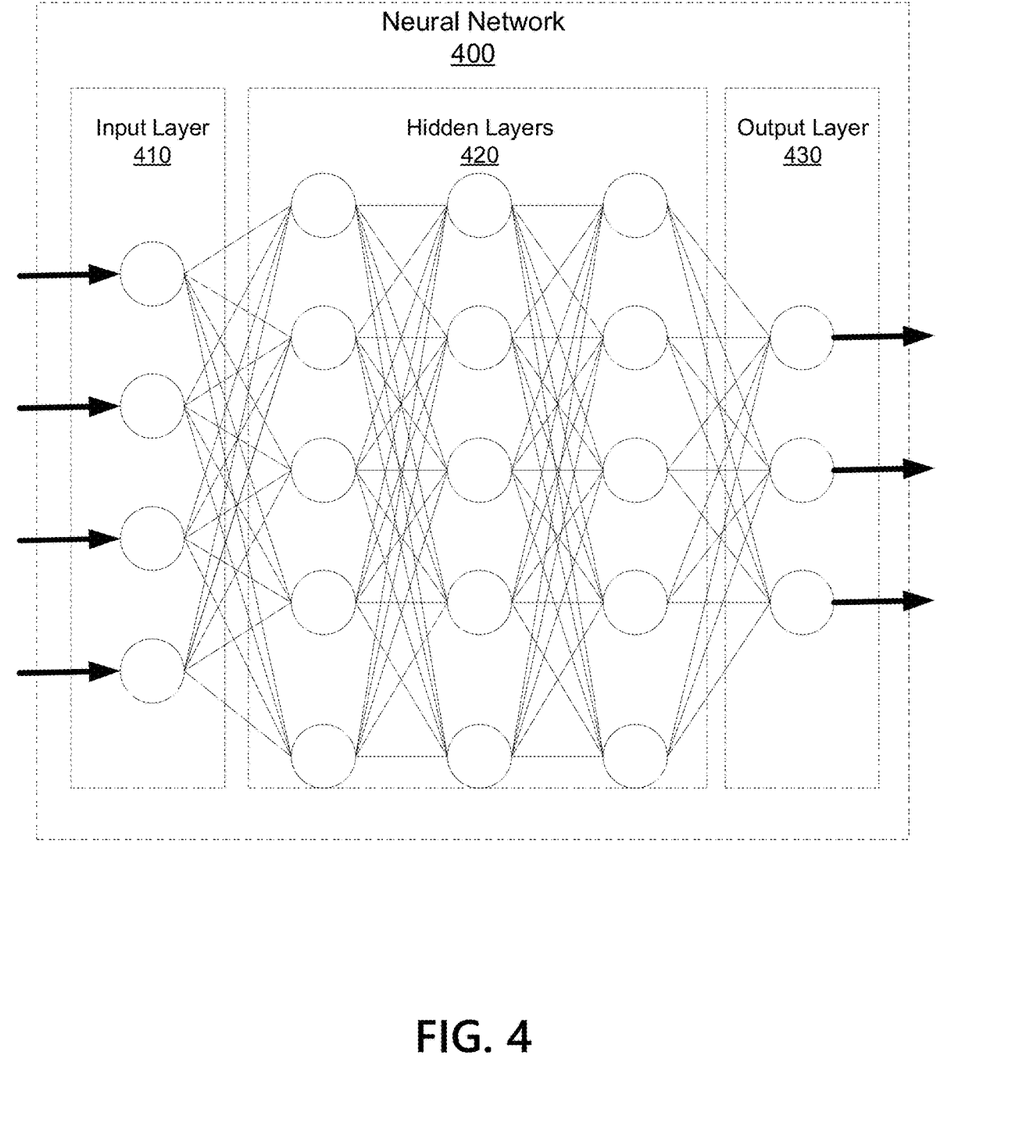
FIG. 4 shows an example neural network architecture 400, which may be used to implement a trained machine learning model for generating spending pattern data as described herein.

FIG. 4 illustrates an example neural network architecture 400, which may be used to implement a trained machine learning model for generating spending pattern data as described herein. An artificial neural network, such as the neural network architecture 400, may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training data set 129 and used to generate predictions regarding the likely results.

An artificial neural network may have an input layer 410, one or more hidden layers 420, and an output layer 430. A neural network may have more than one hidden layer. Illustrated network architecture 400 is depicted with three hidden layers. The number of hidden layers employed in the neural network 400 may vary based on the particular application and/or problem domain. Similarly, the number of input and/or output nodes may vary based on the application. Many types of neural networks are used in practice, such as convolutional neural networks, recurrent neural networks, feed forward neural networks, combinations thereof, and others.

During the machine learning model training process, machine learning software 127 may adjust the weights of each connection and/or node in a learning process as the machine learning model adapts to generate more accurate predictions on a training data set 129. The weights assigned to each connection and/or node may be referred to as the machine learning model parameters. The model may be initialized with a random or white noise set of initial model parameters. The model parameters may then be iteratively adjusted using, for example, stochastic gradient descent algorithms that seek to minimize errors in the machine learning model. As described below with respect to steps 505 and 506 of FIG. 5, the trained model may be used to implement a model that generates spending patterns based on transaction data.

Figure 5:
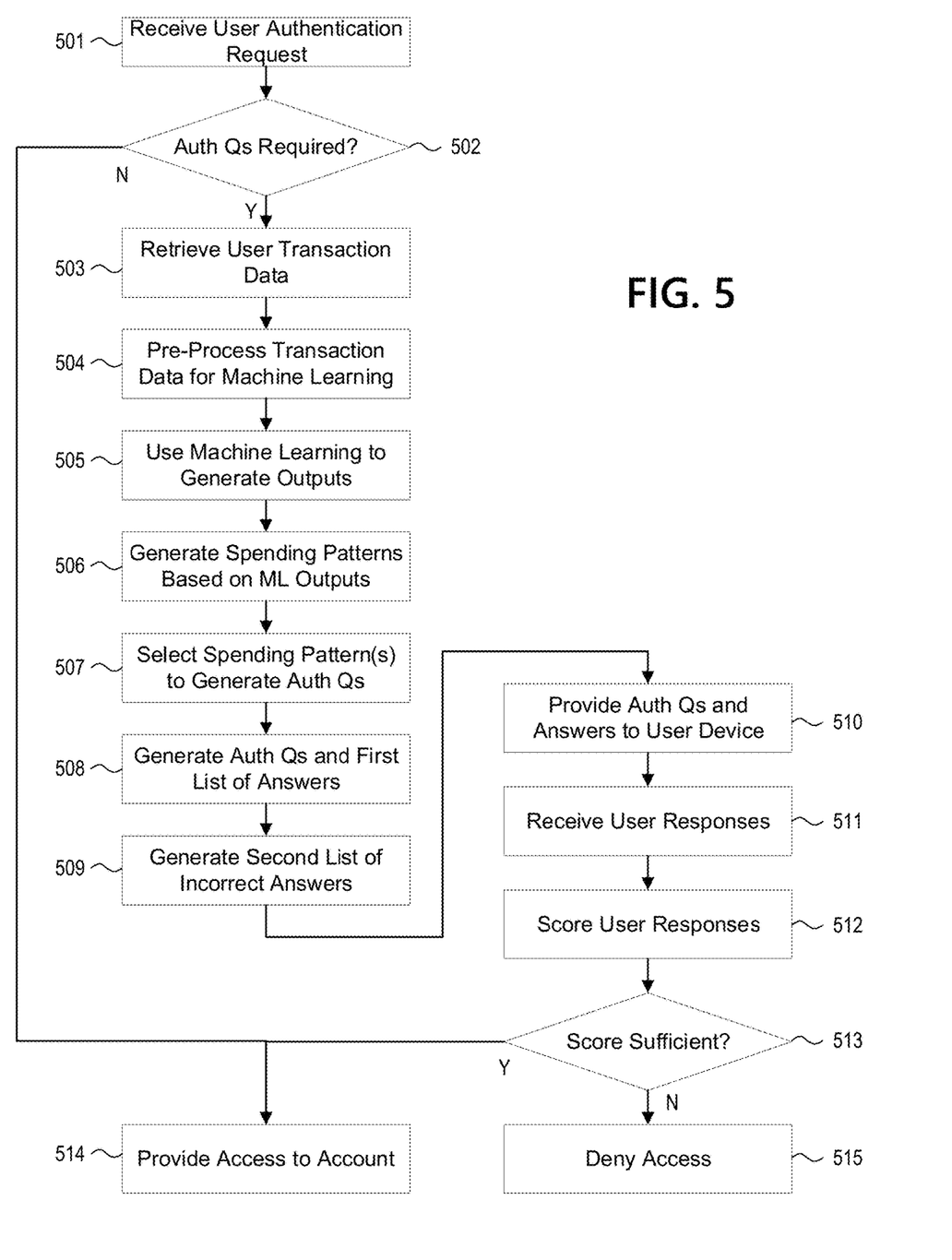
FIG. 5 shows a flow chart of a process for detecting user spending patterns and generating questions to authenticate a user as described herein

FIG. 5 illustrates a method for authenticating a user based on authentication questions about user spending patterns, which may be generated based on transaction data using machine learning techniques.

At step 501, the authentication server 101 may receive a request to authenticate a user from a user device associated with a user, a device operated by a customer service representative (e.g., a phone operator) who needs to authenticate a user, or some other device. In some cases, the user device may access a website associated with the user account (e.g., a banking website) and attempt to obtain access to the account. Additionally and/or alternatively, the user may call in to a customer service call center, and a customer service agent may use a computing device to submit a request to authenticate the user on behalf of the user. Additionally and/or alternatively, the request to access the account may be part of a request to access and/or change sensitive data associated with an account (e.g., when a user requests financial data associated with an account after logging in, when a user requests to change an address or other contact information, etc.), may be part of a request to perform a transaction or the like At decision 502, the authentication server 101 may decide whether the user needs to be authenticated using authentication questions before the authentication server 101 provides access to the account. For example, the authentication server may determine that the user needs to be authenticated if the user is registering for access to a website for the first time, if the user has not logged onto the website from a particular user device before, if the account was recently locked due to a suspicious transaction, if there was a recent fraud report associated with the account, etc. Additionally and/or alternatively, the user may need to be authenticated using authentication questions when the user requests to access or edit certain data associated with an account (e.g., if a user requests access to financial data after logging in to an account, if a user requests to change contact information, etc.), the user may need to be authenticated to perform a transaction for the account, etc. Additionally and/or alternatively, the authentication questions may be used by customer service agents to authenticate the user whenever a user calls into a call center, engages with the customer service representative in a chat session, or the like. If the authentication server 101 decides to authenticate the user using authentication questions, the process may proceed to step 503. If the authentication server 101 decides the user does not need to answer authentication questions (e.g., if the user provided a correct password from a recognized device), the method may proceed to step 514.

At step 503, the authentication server 101 may identify the user account associated with the user and retrieve transaction data for the user account. The authentication server 101 may store the transaction data in a database (e.g., internal database 131) and/or may retrieve the transaction data from the account server 105 (e.g., by supplying a user identification number in a lookup request to the account server 105, which may obtain the corresponding transaction data and reply to the authentication server 101).

As shown for the example transaction data 200, the user transaction data may include a plurality of data fields for each transaction, including one or more of a transaction time, a merchant name and/or merchant identifier, a type of merchant, an amount for the transaction, etc. The transaction data 200 may include other fields beyond the data fields shown in FIG. 2; for example, each transaction entry could have a data field indicating a location of the merchant or any other data about the merchant.

At step 504, the authentication server 101 may preprocess the transaction data in order to generate machine learning inputs. Some of the data shown in FIG. 2 could be generated or edited in the preprocessing step. For example, the transaction data could merely store a timestamp (e.g., in UNIX format) for each transaction, and the authentication server 101 at step 504 could then generate, from the timestamp, a data field indicating the date and/or time in an alternate format.

Additionally and/or alternatively, the authentication server 101 may generate other fields based on known information associated with the transaction. For example, the authentication server 101 may look up a location of each merchant, and generate location data (e.g., GPS coordinates) for a location data field that indicates the location of each merchant. Additionally and/or alternatively, the authentication server 101 may perform a menu lookup to determine what item the user actually or likely purchased based on the transaction amount for each transaction. For example, the authentication server may access a merchant's menu to determine that a particular purchase price for a transaction at the merchant indicates that a user purchased a particular item (e.g., a $3.15 charge may correspond to a cappuccino for "Café Viraj"), and thus may add an indication of the specific item that was purchased to a field of the transaction data.

The authentication server 101 may also pre-process the transaction data by standardizing, normalizing, or otherwise performing feature scaling on numerical data fields in order to condition the data for the machine learning algorithms. Additionally and/or alternatively, the authentication server 101 may perform one-hot encoding on categorical data fields, or perform other such preprocessing techniques to prepare the transaction data for the machine learning algorithms.

At step 505, the authentication server 101 may use one or more machine learning algorithms on the machine learning inputs to generate the spending patterns. The authentication server 101 may use clustering algorithms to generate clusters of transactions, which may then be further analyzed to generate spending patterns at step 506.

The authentication server 101 may use a hierarchical clustering algorithm on the transaction data 200 to generate a hierarchy of transaction clusters that represent different ways of dividing the transactions into clusters. For example, at a highest level of clustering generated by a hierarchical clustering algorithm, the data may be separated by merchant types. Then, at a second level of clustering, the data may be separated by merchant. Further down the hierarchy (e.g., at a third level, etc.), the data may be separated by any other data supplied by to the machine learning algorithm, such as transaction amount, location, whether the transaction matched a rewards category, etc. Thus, the hierarchical clustering algorithm may generate a hierarchical tree specifying different clusters of varying specificity, which may be further analyzed in order to generate a spending pattern (as described at step 506).

Additionally and/or alternatively, the authentication server 101 may use a non-hierarchical clustering algorithm to cluster the transactions of the transaction data 200, such as k-means, k-mode, DBSCAN, a Gaussian mixture model, or any other clustering method. The authentication server 101 may select default parameters, such as a size of a cluster and the minimum number of points to form a cluster for a DBSCAN algorithm, a number k of clusters to form for a k-means or k-mode algorithm, or the like. The authentication server 101 may then execute the clustering algorithm to generate clusters of transactions, as shown using example data in FIG. 3. Each cluster of transactions may be defined by a data structure (e.g., a vector) including a plurality of transaction identifiers for the transactions assigned to a cluster. In some cases, a single data structure may be used to hold data for each of the clusters (e.g., a vector of vectors). In some cases, the machine learning algorithm may not assign a transaction to any cluster (e.g., because it is an outlier and/or because a cluster must have a certain minimum number of transactions).

Additionally and/or alternatively, the authentication server 101 may use a trained machine learning model, such as a neural network (e.g., according to the neural network architecture of FIG. 4), support-vector machine, naive Bayes classifier, or some other machine learning model generated using supervised learning processes to perform the clustering and/or pattern detection. Trained machine learning models may have the benefit of being able to more accurately generate clusters and/or directly generate labeled spending patterns because the models are trained using detailed training data correlated with labeled outputs. The authentication server 101 may train a model (e.g., a neural network) as shown in FIG. 4 and as described below. The authentication server 101 may execute the training process to train the neural network of FIG. 4 prior to the process of FIG. 5, so that a trained model is pre-prepared for use at step 505. Additionally and/or alternatively, the authentication server 101 may train the machine learning model as part of the process of FIG. 5 (e.g., as a substep of step 505) and/or in parallel to the execution of the process of FIG. 5.

The authentication server 101 may provide the inputs generated at step 504 to the trained machine learning model, which may be trained to output clusters of transactions and/or data that describes patterns observed from the transactions. When the machine learning model is trained to output data indicating transaction clusters, it may generate data very similar to the data generated by the clustering algorithms described above. For example, the trained model may generate outputs indicating a list of transactions that are assigned to a first cluster, a list of transactions that are assigned to a second cluster, etc.

Additionally and/or alternatively, the trained machine learning model may directly output one or more data structure(s) indicating patterns derived from the transaction data, such as one or more vectors describing one or more spending patterns. For example, a trained machine learning model, after processing the transaction data 200 as machine learning inputs, may output a vector indicating <coffee shops, gas stations>, which indicates that the user has a regular spending pattern of shopping at coffee shops and gas stations. As another example, the trained machine learning model may output a vector indicating <gym, Maiman Club>, which indicates that the user has a regular spending pattern of shopping at a particular gym. As a third example, the trained machine learning model may output a vector indicating <Feb. 26, 2021—present, gas stations, DaveMart, Sam's Stop, 1>, which may indicate that the user has a spending pattern that started on Feb. 26, 1921 and continues to the present, and the spending pattern is shopping at gas stations including DaveMart and Sam's Stop. In this third example, the final data field of the vector may indicate that the spending pattern corresponds to a rewards category for gas stations.

At step 506, the authentication server 101 may generate one or more spending pattern data structure(s) based on the machine learning outputs that were generated at step 505, if the machine learning model did not already output the spending pattern data (e.g., if a clustering algorithm was used, then further processing may be required to generate spending pattern data structure(s)). Thus, if the machine learning outputs generated at step 505 include clusters of transactions, the authentication server 101 may automatically analyze the clusters to generate spending pattern data structure(s).

The authentication server 101 may thus analyze a cluster of transactions to determine common characteristics of the cluster, and store such common characteristics in a spending pattern data structure (e.g., a vector). For example, the authentication server 101 may determine that a cluster of transactions each are commonly associated with a particular merchant and/or merchant type. Some or all transactions of a cluster may be associated with a particular merchant (e.g., a particular coffee shop that a user regularly visits) and/or a particular merchant type. Some clusters may be associated with several merchants of the same type. Accordingly, the authentication server may generate one or more data field values indicating one or more common merchant type(s) and/or common merchant(s) for a particular spending pattern, and store such as value in a spending pattern data structure.

The authentication server 101 may further analyze transaction date and/or time data to determine whether a particular spending pattern is a persistent spending pattern, or whether it started at a particular time and/or ended at a particular time. In some cases, if the spending pattern is a persistent spending pattern, the authentication server 101 may generate a value indicating that the spending pattern has no beginning time and/or ending time, and store such a value in a spending pattern data structure. Additionally and/or alternatively, the authentication server 101 may use a null value or other default value for data field(s) of the spending pattern that indicates a beginning time and/or ending time. These values may be added to a spending pattern. For example, a data structure indicating an example spending pattern corresponding to the cluster 302A of FIG. 3 may be <null, null, coffee, Café Viraj, Jenny's Coffee>, where the first two null values indicate that there is no starting time or ending time associated with the spending pattern (i.e., the pattern is a persistent pattern). As another example, the example spending pattern corresponding to the cluster 302B of FIG. 3 may be <Feb. 26, 2021, null, gas, DaveMart, Sam's Stop>, where the first two values indicate that the spending pattern is associated with a particular start data, but no particular end date. In a similar way, other example spending patterns may define an end date but no start date, both start and end dates, and other such variations.

The authentication server 101 may use any common property of the transactions in a cluster to generate a data field for a spending pattern data structure using the techniques described above. For example, the authentication server may generate field(s) indicating whether a particular spending pattern corresponds to a rewards category or not, and include such a data field in the spending pattern data structure(s).

The authentication server 101 may combine the data fields for various properties associated with transactions of a cluster into a data structure defining one or more spending patterns. For example, as described above, a cluster may be associated with common properties for a time period, a merchant, and a merchant type, and therefore a vector specifying each of these data fields may be generated (e.g., a vector indicating <null, null, coffee, Café Viraj, Jenny's Coffee>). Other example spending pattern data structures (e.g., vectors) may also be generated with more and/or fewer data fields specified, and/or with default values assigned to particular data fields, based on the properties that are common to a particular cluster. In some cases, the authentication server 101 may generate a data structure specifying a plurality of different spending patterns (e.g., a vector of spending pattern vectors) by combining multiple spending pattern data structures into a larger data structure.

When a neural network or other trained machine learning model was used at step 505 to directly generate spending pattern data, then at step 505 the authentication server 101 may only need to perform minimal or no further processing on the outputs of the trained machine learning model to generate a spending pattern data structure. For example, if a trained machine learning model used at step 505 outputted a vector specifying a spending pattern of <coffee, Café Viraj, Jenny's Coffee>, then the authentication server 101 may perform some further processing on the vector output, such as assigning a default value (e.g., "null") to a starting and/or ending time field(s), and then may store the modified data structure as a spending pattern data structure. In other cases, the output of a trained machine leaning model may be used directly as a spending pattern data structure. Thus, the particular machine learning techniques used at step 505 may affect how much and what type of processing needs to be done on the machine learning output(s) at step 506.

At step 507, the authentication server 101 may select one or more of the spending patterns generated at step 506 to be used to generate one or more authentication questions. The authentication questions may ask users about their patterns of transactions in order to provide questions that are difficult for malicious users to guess.

As part of step 507, the authentication server 101 may determine how many authentication questions about spending patterns need to be generated in order to authenticate a user. In some cases, the authentication server 101 may only need to generate a small number (e.g., one or two) of authentication questions about spending patterns, and may generate other authentication questions using other strategies. In some cases, the number of authentication questions required may vary based on other contextual information. For example, the authentication server 101 may generate a larger number of authentication questions if there was a recent report of fraud associated with a particular user account.

The authentication server 101 may then select a number of spending patterns to use to generate questions, and may then generate a list of matching merchants for each selected spending pattern. For example, the authentication server 101 may determine to generate three spending pattern questions, and thus may use each of the example spending patterns shown at FIG. 3 to generate a question.

In some cases, the authentication server 101 may choose not to use a particular spending pattern data structure to generate a question. For example, the authentication server 101 may maintain a log of previous authentication requests, and which spending patterns were used to generate previous authentication questions. The authentication server 101 may then avoid selection of certain spending patterns that were previously used during previous authentication processes, for example by excluding the previously-used spending patterns from any consideration and/or by preferring other spending patterns if available. The authentication server 101 may maintain such records for a particular period (e.g., the last two weeks) in order to avoid frequent reuse of similar questions on the same spending patterns.

In some cases (e.g., for new accounts with only a small number of transactions recorded, for accounts that are shared among different users, and/or for users that have highly variable behavior patterns), the authentication server 101 may determine that no spending patterns were generated and/or that no authentication questions about spending patterns should be generated, and may thus rely on other strategies to generate authentication questions. In such a case, the authentication server 101 may terminate the process of FIG. 5 and use another process to generate authentication questions.

If a particular account is associated with more spending patterns than questions that need to be generated, the authentication server 101 may simply randomly select patterns that were generated at step 506, and generate the list of merchants for each randomly selected spending pattern. For example, if the authentication server 101 needs to generate two authentication questions, it may simply randomly select two spending patterns that were generated at step 506, each of which may be used to generate a single question. Additionally and/or alternatively, the authentication server 101 may preferentially select spending patterns that were not recently used to generate an authentication question.

At step 508, the authentication server 101 may generate a question and a first list indicating correct answers for each of the spending patterns that were selected at step 507. The first list of correct answers may include one or more merchants that match the particular spending pattern used to generate the question. For example, if the chosen spending pattern indicated <coffee shops, gas stations>, then the first list of correct answers may include various coffee shops and gas stations that the user transacted with. In some cases, the first list of correct answers may be filtered to recent transactions (e.g., transactions that took place within the last thirty days).

The authentication server 101 may use a default question (e.g., "Which of these merchants did do you frequently shop at?"). Additionally and/or alternatively, the authentication server 101 may generate a question by tailoring a default question template based on the spending pattern selected. For example, the authentication server 101 may populate a default template (e.g., "Which of these [merchant type(s)] do you frequently shop at?") with one or more particular merchant type(s) (e.g., "coffee shops" and "gas stations") to yield the question ("Which of these coffee shops and gas stations do you frequently shop at?"). Additionally and/or alternatively, a question template may indicate a beginning time and/or an ending time (e.g., "Which of these merchants did you frequently shop at between [date] and [date]?", which may be populated based on corresponding beginning and ending date fields of a spending pattern data structure. Other similar templates and question formats may be used.

The authentication server 101 may generate the first list of correct answers by selecting one or more merchants from a spending pattern data structure. In some cases, the authentication server 101 may generate a correct answer for every merchant listed in the spending pattern data structure (e.g., for a spending pattern indicating the particular merchants "Café Viraj" and "Jenny's Coffee," both of these merchants may be used as correct answers). Additionally and/or alternatively, the authentication server 101 may choose fewer than all of the merchants associated with a particular spending pattern as correct answers. The authentication server 101 may select among the merchants randomly (e.g., it may randomly select "Café Viraj" if only one correct answer is needed). The authentication server 101 may select a random number (e.g., between one and a maximum number of merchants associated with a spending pattern) of correct answers, and thus may randomly select as many merchants that match the spending pattern as necessary to be correct answers. Additionally and/or alternatively, instead of random selection, the authentication server 101 may prefer to select merchants that were not recently used as correct answers in previous authentication questions. Thus, for example, if a particular spending pattern indicates that the user has shopped at three different gas stations, but two of the gas stations were already used as correct answers for an authentication question that was recently used to authenticate the user, then the authentication server 101 may select the correct answers from among the four remaining gas stations that were not recently used to generate authentication questions. By selecting merchants indicated by a spending pattern as correct answers, the authentication server 101 is ensuring that the merchants that match user transaction data will be selected as correct answers, because the spending pattern data is generated based on the user transaction data, as described above.

Then, at step 509, the authentication server 101 may generate, for each question, a second list indicating incorrect answers that do not match a particular spending pattern. The authentication server 101 may select merchants that are similar to the correct answer merchants, but that do not appear in user transaction data, as incorrect answers. For example, if the two correct answers generated at step 508 are two particular coffee shops, then the authentication server 101 may select two other nearby merchants of the same merchant type (e.g., two nearby coffee shops) that the user has not visited as incorrect answers.

Thus, the authentication server 101 may generate a second list of merchants (indicating incorrect answers) of the same merchant type indicated by a spending pattern, but that do not match a particular merchant or any particular transaction of the transaction data 200. In some cases, the selected incorrect merchants for the second list of merchants may be located within a particular threshold distance of the correct answer merchants (e.g., less than a mile from one of the correct answer merchants). By choosing plausible incorrect answers (e.g., nearby merchants that the user did not visit, that have the same merchant type as the correct answers), the authentication server 101 avoids making the incorrect answers obvious and therefore guessable by a malicious user attempting to gain unauthorized access to the account.

In some cases, the authentication server 101 may verify that the incorrect answers on the second list of merchants do not match any transactions of the transaction data 200. Thus, if a particular merchant is selected as an incorrect answer, the authentication server 101 may verify that the user never shopped at that merchant. In some cases, as long as a user did not shop at a particular merchant within a certain amount of time (e.g., in the last year), it may be used as an incorrect answer. In some cases, the authentication server 101 may also check transaction data associated with a different user account to verify that the user did not perform transactions with a merchant used as an incorrect merchant on another account. If the authentication server 101 determines that a user did perform a transaction with a merchant used as an incorrect answer (e.g., on the same account and/or on another account), it may remove the merchant from the second list and select another merchant to add to the second list in its place.

The authentication server 101 may select a certain number of merchants as incorrect answers for addition to the second list. The number may be selected so that the total number of correct and incorrect answers is a particular number (e.g., five) for each question. Thus, if two correct answers were added to the first list for one question, then three incorrect answers may be added to the second list for that question. Additionally and/or alternatively, the authentication server 101 may generate an equal number of correct and incorrect answers such that the first list and the second list have the same number of merchants for each question (e.g., four correct answers and four incorrect answers for one question, two correct answers and two incorrect answers for another question, etc.). In some cases, more answers may be generated in certain contexts (e.g., if there was a recent fraud report associated with an account, the authentication server 101 may provide a larger number of correct and/or incorrect answers). Other strategies may also be used, such as randomly varying the number of correct and incorrect answers.

At step 510, the generated question, first list, and second list for each authentication question may be combined to generate the authentication question and answers. For example, if the authentication question is being provided to the user via a web page, then the authentication server 101 may generate web page information (e.g., HTML, Javascript, etc.) that causes display of the question and corresponding answers. The web page information may instruct the user how to respond to the question. For example, the user may be instructed to indicate, for each merchant, whether the user recently transacted with that merchant or not. Additionally and/or alternatively, the user may be instructed to select the merchants that the user did transact with, and to avoid selecting the merchants that the user did not transact with. In some cases, a third option may be presented for each merchant that allows a user to indicate that they do not remember whether they transacted with a certain merchant or not. The authentication server 101 may provide the authentication questions all at once (e.g., multiple questions on a single web page) or in sequence (e.g., a first web page may require the user to answer a first question, then a second web page may require the user to answer a second question, etc.). Instead of a web page, the authentication questions may also be provided to the user by a customer service representative (e.g., via phone or chat) or by any other mechanism. Then, at step 511, the authentication server 101 may receive the user responses to the authentication questions.

At step 512, the authentication server 101 may score the user responses. In general, the authentication server 101 may increase an authentication score when the user correctly indicates that they transacted with a merchant on the first list of (correct) merchants, and when they correctly indicate that they did not transact with a merchant on the second list of (incorrect) merchants. Conversely, the authentication server 101 may decrease an authentication score when the user incorrectly indicates that the did not transact with a merchant on the first list of (correct) merchants, and when they incorrectly indicate that they did transact with a merchant on the second list of (incorrect) merchants. However, the authentication server 101 may use various mechanisms to generate the score.

In one example, the authentication server 101 may assign a first value to each correct answer (e.g., +20 points) and a second value to each incorrect answer (e.g., −40 points). If a third option that allows a user to indicate they do not remember whether a transaction occurred or not was provided (as described above), then a third value (e.g., −5 points) may be used for each time the user selects the third option. The authentication server 101 may then simply total the values for each answer to calculate an authentication score.

Additionally and/or alternatively, the authentication server 101 may assign different weights to the values for each answer. In one example, the weight assigned to an answer about a merchant may be based on a number and/or frequency of user transactions with the merchant. For example, if a user frequently transacted with a particular merchant according to the transaction data 200 (e.g., at least ten transactions with the merchant in the transaction data 200), and the user incorrectly indicates that they did not transact with the merchant, then the negative score for the incorrect answer may be increased (e.g., the −40 points may be doubled and/or increased in proportion to the number and/or frequency of transactions with the merchant). Conversely, if the user only transacted with a merchant infrequently and/or less than a certain number of times, the negative penalty for an incorrect answer may be reduced.

Additionally and/or alternatively, weights may be assigned by category of merchant. For example, users may commonly have difficulty remembering exactly which gas station merchants they transacted with, but may more easily remember which coffee shops they visited. These differences may be measured by recording how often users in general incorrectly answer questions about one merchant category versus another. For example, if the authentication server 101 frequently receives incorrect answers from users when it asks questions about gas station transactions, it may reduce a weight for an incorrect response to an authentication question about gas stations. Accordingly, weights may be assigned to answers for various categories based on stored weights that are determined by the authentication server 101. These weights may be updated over time by the authentication server 101 as more user responses are received.

Additionally and/or alternatively, a trained neural network may be used to generate the authentication score. Because a neural network may be trained using historical answer data and authentication decisions, it may automatically be able to infer that different weights should be assigned to different types of answers for various reasons, such as the ones explained above.

The neural network trained to generate the authentication score may use the architecture shown in FIG. 4. It may be trained using a training data set that correlates historical user answers to authentication questions provided by various users, including indications of whether each answer is correct or not, with labeled output data indicating whether a particular user was authenticated or not. For example, the training data set may indicate a particular set of merchants provided as answers to a user, various data about the merchants such as merchant type, the user's answers to each answer, whether each answer was correct or not, and a labeled output indicating whether the user was authenticated or not. The neural network may be trained using the training data set using one or more training techniques, such as a backpropagation algorithm.

Then, at step 512, the authentication server 101 may use the trained neural network to output an authentication score based on the user responses to the questions. The user response data and the merchant data may be formatted as input to the trained neural network using one or more pre-processing steps, then the authentication server 101 may use the trained neural network to generate an output indicating an authentication score.

At decision 513, the authentication score generated at step 512 may be compared to an authentication threshold to determine whether the user is authorized for access to the account. The authentication threshold may be a predefined number (e.g., 100) that is compared to the authentication score. If the authentication score is greater than the threshold, the user may be granted access to the account at step 514. If the authentication score is not greater than the threshold, the user may be denied access to the account at step 515.

By generating authentication questions based on user spending patterns, the authentication server 101 can accurately authenticate a user by asking questions that an authentic user is likely to know and that a malicious user is likely to not know. Furthermore, by generating the questions based on frequent user spending patterns, especially when the user spending patterns that change over time, a user is more likely to recognize a merchant used to generate a question, thus increasing the security and reliability of the authentication process.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
    training, using first training data, a first machine learning model to identify clusters of transactions in input transaction data by modifying, based on the first training data, one or more first weights of one or more first nodes of a first artificial neural network;
    training, using second training data comprising correlations between historical user answers to authentication questions and indications regarding whether users were provided account access, a second machine learning model to output one or more authentication scores by modifying, based on the second training data, one or more second weights of one or more second nodes of a second artificial neural network;
    receiving, from a user device, a request for access to an account associated with a user;
    retrieving transaction data for the account, wherein the transaction data indicates a plurality of transactions;
    generating, based on the transaction data, for each transaction of the plurality of transactions, machine learning inputs;
    providing the machine learning inputs to the trained first machine learning model;
    receiving, from the trained first machine learning model and in response to the machine learning inputs, one or more machine learning outputs that comprise a plurality of vectors that each comprise a plurality of transaction identifiers for one or more transactions of the plurality of transactions assigned to a cluster of one or more clusters;
    generating, using a hierarchical clustering algorithm, one or more hierarchies of the one or more clusters of the plurality of transactions;
    generating, based on the one or more hierarchies of the one or more clusters of the plurality of transactions, a plurality of different spending pattern vectors associated with the user, wherein generating the plurality of different spending pattern vectors comprises, for each of the plurality of different spending pattern vectors:
        determining based on the one or more hierarchies of the one or more clusters of the plurality of transactions, that at least one cluster of the one or more dusters is associated with several different merchants corresponding to a common merchant type;
        determining that the at least one cluster is associated with a starting time and an ending time;
        generating, based on the common merchant type, the starting time, and the ending time, a spending pattern vector; and
    selecting, based on a log of past authentication requests associated with the user, a subset of the plurality of different spending pattern vectors:
    generating, based on the subset of the plurality of different spending pattern vectors, a list of merchants to authenticate the user, wherein the list of merchants comprises:
        at least one first merchant that matches at least one transaction indicated by the transaction data, and
        at least one second merchant that does not match any transactions indicated by the transaction data;
    providing the list of merchants to the user device;
    receiving, from the user device, and for each merchant on the list of merchants, a response indicating whether the user transacted with a corresponding merchant;
    providing, as input to the trained second machine learning model, the responses to the list of merchants;
    receiving, as output from the trained second machine learning model, a first authentication score; and
    providing, to the user device and based on the authentication score, access to the account.

2. The method of claim 1, wherein the at least one of the plurality of different spending pattern vectors comprises a data field indicating whether a corresponding spending pattern is associated with a rewards category.

3. The method of claim 1, wherein the generating the list of merchants comprises:
    determining a plurality of merchants that each match at least one transaction indicated by the transaction data; and
    removing, from the plurality of merchants, one or more merchants that do not match a type of merchant indicated by at least one of the plurality of different spending pattern vectors.

4. The method of claim 1, wherein:
a highest level of the one or more hierarchies of the one or more clusters of the plurality of transactions corresponds to merchant type,
wherein a second highest level of the one or more hierarchies of the one or more clusters of the plurality of transactions corresponds to merchant identity,
wherein a third highest level of the one or more hierarchies of the one or more clusters of the plurality of transactions corresponds to rewards category.

5. The method of claim 1, wherein the starting time and the ending time indicate a period of time over which the user frequently transacts with the common merchant type via the account.

6. The method of claim 1, wherein at least one of the plurality of different spending pattern vectors indicates at least one type of merchant corresponding to the common merchant type.

7. The method of claim 1, wherein the providing access to the account comprises determining that the authentication score is higher than a threshold score.

8. The method of claim 1, wherein the first training data comprises a plurality of second transactions correlated with labeled outputs which indicate one or more clusters of the plurality of second transactions.

9. A computing device comprising:
one or more processors; and
memory storing instructions that, when executed by the one or more processors, cause the computing device to:
train, using first training data, a first machine learning model to identify clusters of transactions in input transaction data by modifying, based on the first training data, one or more first weights of one or more first nodes of a first artificial neural network;
train, using second training data comprising correlations between historical user answers to authentication questions and indications regarding whether users were provided account access, a second machine learning model to output one or more authentication scores by modifying, based on the second training data, one or more second weights of one or more second nodes of a second artificial neural network;
receive, from a user device, a request for access to an account associated with a user;
retrieve transaction data for the account, wherein the transaction data indicates a plurality of transactions;
generate, based on the transaction data, for each transaction of the plurality of transactions, machine learning inputs;
provide the machine learning inputs to the trained first machine learning model;
receive, from the trained first machine learning model and in response to the machine learning inputs, one or more machine learning outputs that comprise a plurality of vectors that each comprise a plurality of transaction identifiers for one or more transactions of the plurality of transactions assigned to a cluster of one or more clusters;
generate, using a hierarchical clustering algorithm, one or more hierarchies of the one or more clusters of the plurality of transactions;
generate, based on the one or more hierarchies of the one or more clusters of the plurality of transactions, a plurality of different spending pattern vectors associated with the user, wherein the instructions, when executed by the one or more processors, cause the computing device to generate the plurality of different spending pattern vectors by causing the computing device to, for each of the plurality of different spending pattern vectors:
determine, based on the one or more hierarchies of the one or more dusters of the plurality of transactions, that at least one duster of the one or more clusters is associated with several different merchants corresponding to a common merchant type;
determine that the at least one cluster is associated with a starting time and an ending time; and
generate, based on the common merchant type, the starting time, and the ending time, a spending pattern vector;
select, based on a log of past authentication re nests associated with the user, a subset of the plurality of different spending pattern vectors;
generate, based on the subset of the plurality of different spending pattern vectors, a list of merchants to authenticate the user, wherein the list of merchants comprises:
at least one first merchant that matches at least one transaction indicated by the transaction data, and
at least one second merchant that does not match any transactions indicated by the transaction data;
provide the list of merchants to the user device;
receive, from the user device and for each merchant on the list of merchants, a response indicating whether the user transacted with a corresponding merchant;
provide, as input to the trained second machine learning model, the responses to the list of merchants;
receive, as output from the trained second machine learning model, a first authentication score; and
provide, to the user device and based on the authentication score, access to the account.

10. The computing device of claim 9, wherein the at least one of the plurality of different spending pattern vectors comprises a data field indicating whether a corresponding spending pattern is associated with a rewards category.

11. The computing device of claim 9, wherein the starting time and the ending time indicate a period of time over which the user frequently transacts with the common merchant type via the account.

12. The computing device of claim 9, wherein at least one of the plurality of different spending pattern vectors indicates at least one type of merchant corresponding to the common merchant type.

13. The computing device of claim 9, wherein the instructions, when executed by the one or more processors, cause the computing device to provide access to the account based on determining that the authentication score is higher than a threshold score.

14. The computing device of claim 9, wherein the first training data comprises a plurality of second transactions correlated with labeled outputs which indicate one or more clusters of the plurality of second transactions.

15. One or more non-transitory computer-readable media storing instructions that, when executed by one or more processors, cause a computing device to:
train, using first training data, a first machine learning model to identify clusters of transactions in input transaction data by modifying, based on the first training data, one or more first weights of one or more first nodes of a first artificial neural network;
train, using second training data comprising correlations between historical user answers to authentication questions and indications regarding whether users were provided account access, a second machine learning model to output one or more authentication scores by modifying, based on the second training data, one or more second weights of one or more second nodes of a second artificial neural network;

receive, from a user device, a request for access to an account associated with a user;

retrieve transaction data for the account, wherein the transaction data indicates a plurality of transactions;

generate, based on the transaction data, for each transaction of the plurality of transactions, machine learning inputs;

provide the machine learning inputs to the trained first machine learning model;

receive, from the trained first machine learning model and in response to the machine learning inputs, one or more machine learning outputs that comprise a plurality of vectors that each comprise a plurality of transaction identifiers for one or more transactions of the plurality of transactions assigned to a cluster of one or more clusters;

generate, using a hierarchical clustering algorithm, one or more hierarchies of the one or more clusters of the plurality of transactions;

generate, based on the one or more hierarchies of the one or more clusters of the plurality of transactions, a plurality of different spending pattern vectors associated with the user, wherein the instructions, when executed by the one or more processors, cause the computing device to generate the plurality of different spending pattern vectors by causing the computing device to, for each of the plurality of different spending pattern vectors:

determine, based on the one or more hierarchies of the one or more clusters of the plurality of transactions, that at least one cluster of the one or more clusters is associated with several different merchants corresponding to a common merchant type;

determine that the at least one cluster is associated with a starting time and an ending time; and generate, based on the common merchant type, the starting time, and the ending time, a spending, pattern vector;

select, based on a log of past authentication requests associated with the user, a subset of the plurality of different spending pattern vectors;

generate, based on the subset of the plurality of different spending pattern vectors, a list of merchants to authenticate the user, wherein the list of merchants comprises:
  at least one first merchant that matches at least one transaction indicated by the transaction data, and
  at least one second merchant that does not match any transactions indicated by the transaction data;

provide the list of merchants to the user device;

receive, from the user device and for each merchant on the list of merchants, a response indicating whether the user transacted with a corresponding merchant;

provide, as input to the trained second machine learning model, the responses to the list of merchants;

receive, as output from the trained second machine learning model, a first authentication score; and provide, to the user device and based on the authentication score, access to the account.

16. The one or more non-transitory computer-readable media of claim 15, wherein the at least one of the plurality of different spending pattern vectors comprises a data field indicating whether a corresponding spending pattern is associated with a rewards category.

17. The one or more non-transitory computer-readable media of claim 15, wherein the starting time and the ending time indicate a period of time over which the user frequently transacts with the common merchant type via the account.

18. The one or more non-transitory computer-readable media of claim 15, wherein at least one of the plurality of different spending pattern vectors indicates at least one type of merchant corresponding to the common merchant type.

19. The one or more non-transitory computer-readable media of claim 15, wherein the instructions, when executed by the one or more processors, cause the computing device to provide access to the account based on determining that the authentication score is higher than a threshold score.

20. The one or more non-transitory computer-readable media of claim 15, wherein the first training data comprises a plurality of second transactions correlated with labeled outputs which indicate one or more clusters of the plurality of second transactions.

* * * * *